Dec. 8, 1959 R. E. NOVKOV 2,915,949
END MILL DRIVING ATTACHMENT
Filed Nov. 22, 1954 2 Sheets-Sheet 2

INVENTOR.
RAYMOND E. NOVKOV
BY
ATTORNEYS

United States Patent Office 2,915,949
Patented Dec. 8, 1959

2,915,949

END MILL DRIVING ATTACHMENT

Raymond E. Novkov, Akron, Ohio, assignor to Manchester Machine & Tool Company, Akron, Ohio, a corporation of Ohio Application November 22, 1954, Serial No. 470,363

7 Claims. (Cl. 90—15)

This invention relates to attachments for machine tools, and especially to a driving attachment particularly suited for an end mill by which a worn end mill can be used for cutting a dimension larger than the end mill.

In the use of various machine tools, the cutter tool naturally gradually wears away with use and sharpening, and standard size cutters after some period of use must be discarded due to being worn down below size. As such cutter tools are relatively costly, this is an expensive part of the use of some machine tools. Yet a further problem that arises in machining actions is that frequently slightly off or irregular sizes must be cut in a work piece. In order to produce such a cut, special cutters must be made and these obviously are costly to produce.

The general object of the present invention is to provide a novel attachment for a machine tool by use of which a standard size slot, for example, can be cut by use of an undersized end mill.

Another object of the invention is to provide a relatively inexpensive, uncomplicated attachment for a machine tool for positioning an end mill or other cutter parallel to and rotatably driven by the drive spindle provided therefor but radially offset therefrom.

Another object of the invention is to drive an end mill or other tool faster than the drive of a supporting main drive shaft or spindle and to give such driven tool planetary movement with relation to the machine tool drive shaft while using the main spindle as a power source.

A further object of the invention is to provide an attachment for use with any desired type of a machine tool for effectively increasing the size of cut produced by a given cutting tool, which attachment is driven by the drive spindle of the machine tool.

A further object of the invention is to provide an attachment for a machine tool powered from the machine tool drive spindle and by which attachment a small but accurate offsetting of the cutter tool axis with relation to the axis of the drive spindle is permitted.

Another object of the invention is to enable a person to use undersized rotary cutting tools for cutting standard size cuts in a work piece.

A further object of the invention is to provide an end mill driving attachment by which a cut having right angle shape at its inner portion or base can be produced, which cut is larger in width than the diameter of the end mill.

The foregoing and other objects and advantages of the invention will be made more apparent as the specification proceeds.

Reference now should be had to the accompanying drawings showing an end mill driving attaachment embodying the principles of the invention, and wherein.

In referring to corresponding parts in the following specification and where such parts are shown in the drawings, corresponding numerals will be used to facilitate comparison between the drawings and the specification.

Figure 1:
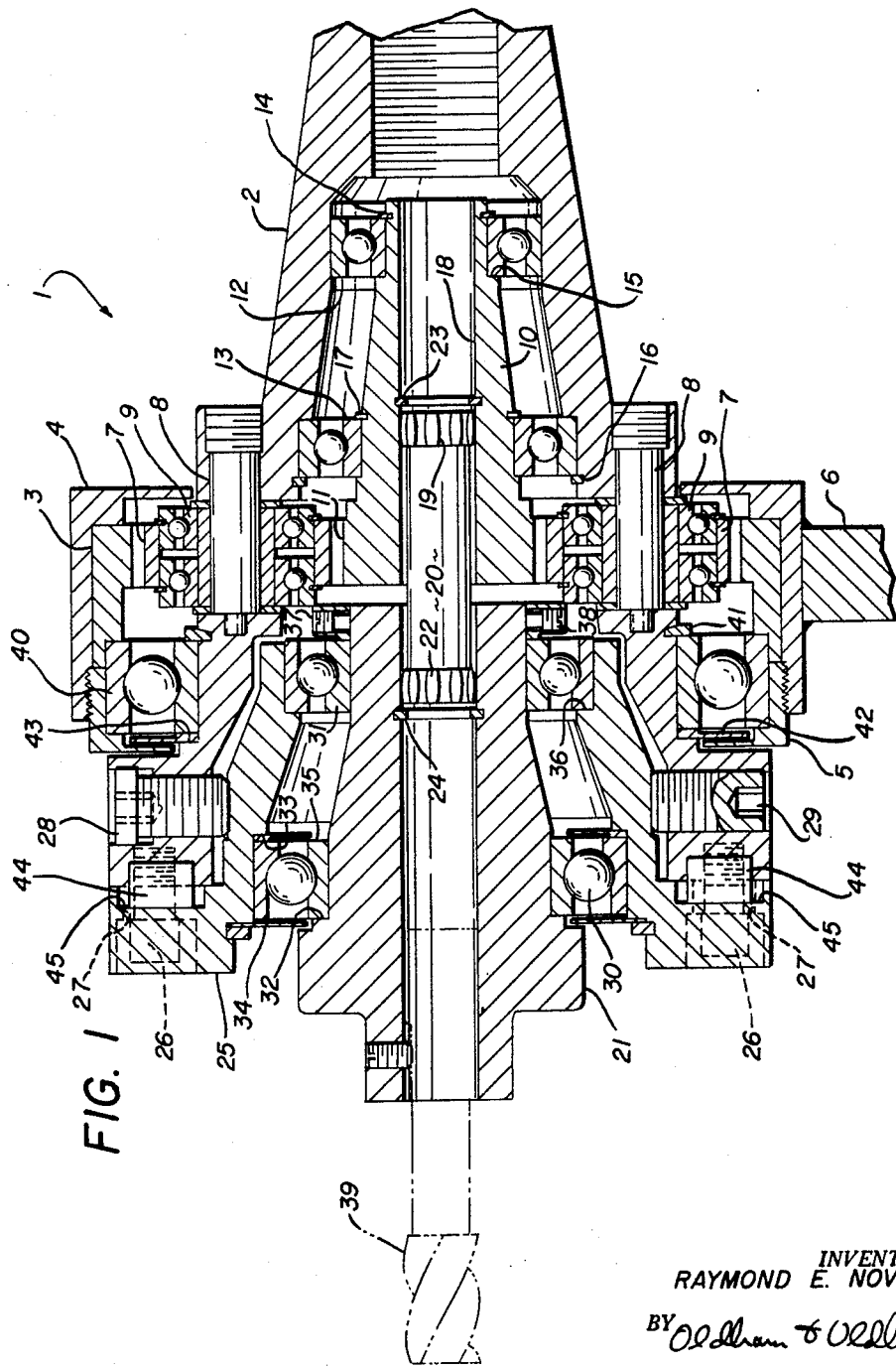
Fig. 1 is a longitudinal section taken on line 1—1 of Fig. 2.

The invention relates to a driving or positioning attachment for a cutter tool and which comprises a drive sleeve, or other drive member, a driven sleeve preferably journalled within the drive sleeve, power transmission means for increasing the rotational speed of the drive sleeve and for connecting it to the driven sleeve, an output member, means for positioning the output member parallel to the driven sleeve but offset radially from the longitudinal axis thereof, and shaft means having longitudinally spaced sets of crowned splines thereon connecting said driven sleeve to said output member to drive such member through sets of splines provided on the members connected together by the shaft means.

Attention now is directed to the details of the structure shown in the drawings, and an attachment for a machine tool is indicated as a whole by the numeral 1. While this attachment can be used in general for positioning any type of a cutting tool upon any machine tool, the invention will be particularly described with relation to a driving attachment for positioning an end mill. The drive attachment 1 is adapted to be secured to a drive shaft or spindle (not shown) of a machine tool by means of a tubular, conical shape, main housing 2 so that the housing will rotate with and be driven by such drive shaft of the machine tool. The machine tool can be, for example, a milling machine, drill press, lathe, or other tool as desired.

One feature of the invention is that the input rotational speed of drive of the attachment is increased in its transmission through the drive attachment 1 of the invention. To achieve such end, a ring gear 3 is provided and it is positioned by a ring gear nut 4. The ring gear nut 4 is held in a fixed position with relation to the ring gear 3 encompassing the tubular main housing 2 by means of a ring gear retainer ring 5 usually in threaded engagement with the ring gear nut 4. Any suitable member, such as an arm 6, is secured to or forms a part of the ring gear nut 4 and extends therefrom to hold the ring gear 3 and unitary associated means (ring gear 3) stationarily positioned. A pair of planetary gears 7, 7 are shown in engagement with the ring gear 3 and such gears are journalled on shafts 8 suitably carried by the main housing 2. Conventional bearings 9 are used for positioning the gears 7, 7 on the shafts 8 for rotation thereon when relative movement occurs between the main housing 2 and the ring gear 3 when the output spindle of the associated machine tool is driven.

A tubular sun gear spindle 10 is provided in the drive attachment 1 and it has a sun gear 11 positioned thereon and usually formed integrally therewith. Such sun gear is meshed or engaged with the planetary gears, 7, 7 to be driven thereby as hereinafter explained in more detail. The sun gear spindle 10 is positioned in the tubular main housing 2 primarily by means of a pair of bearings 12 and 13. Fig. 1 of the drawing clearly shows that the bearing 12 is held in place by means of a split lock ring 14 which abuts the bearing 12 at one side thereof and by a shoulder 15 provided on the periphery of the sun gear spindle 10. Split lock rings 16 and 17 engage with opposite lateral portions of the bearing 13 and with adjacent portions of the main housing 2 and the periphery of the sun gear spindle 10, as shown, to hold such bearing in a definite fixed position.

So as to provide a driving connection for the output member of the drive attachment 1, as explained hereinafter, the bore 18 of the sun gear spindle 10 is provided with a set of straight splines intermediate the ends thereof. This set of splines is engaged with a corresponding set of crowned splines 19 provided on one end, usually, of a drive shaft 20. The drive shaft 20 extends into an output member 21 and engages a set of straight splines formed in a bore thereof by a set of crowned splines 22 shown adjacent the opposite end of the drive shaft 20. By use of the particular driving arrangement referred to, a direct drive is provided between the sun gear spindle 10 and the output member 21 but with the crowned spline connections permitting the axis of the drive shaft 20 to be at an acute angle, such as about 2 or 3°, with the axis of the sun gear spindle 10. The drive shaft 20 is held against axial movement by a split lock ring 23 which engages with the wall of the bore in the sun gear spindle 10 adjacent the inner end of the drive shaft, and by a second lock ring 24 which engages a recess provided in the bore of the output member 21 so that no extended axial movement of the stubby drive shaft is permitted. It will be seen that the drive shaft 20 and crowned splines thereon provides, in effect, a shaft connected to members at each end thereof by universal joints and that such a construction, for example, could be substituted for the spline and shaft construction disclosed.

Figure 2:
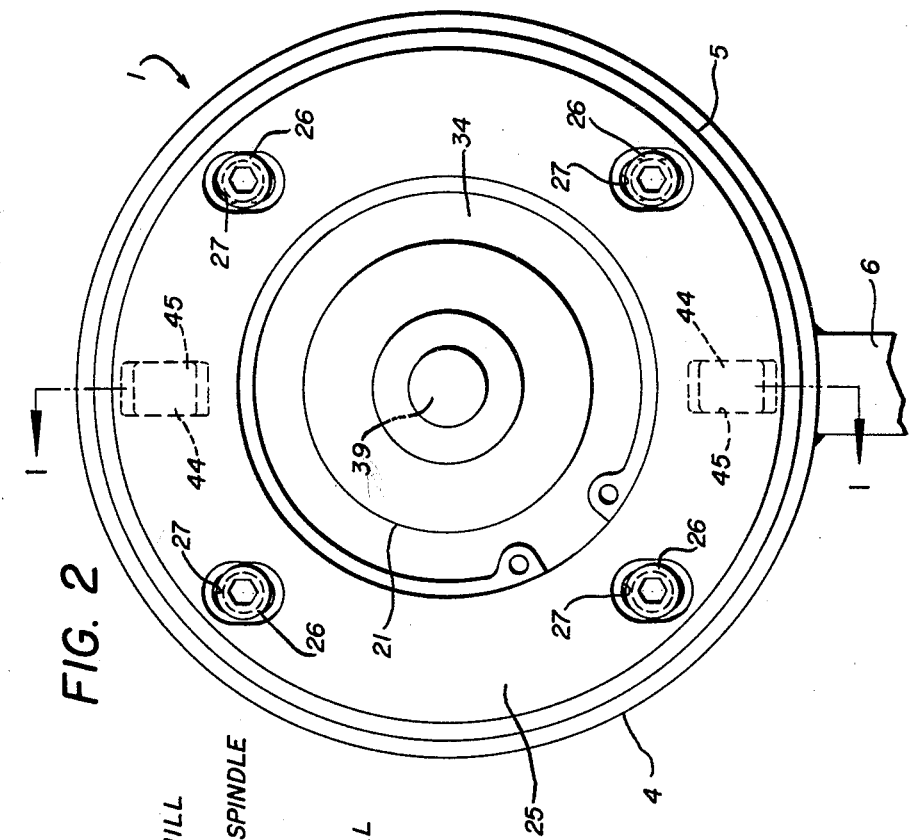
Fig. 2 is an end elevation of the end mill driving attachment shown in Fig. 1.

In order to position the output member 21 properly in the attachment of the invention Fig. 1 of the drawings best shows that the main housing 2 has a portion axially overlapping the output member 21 and radially spaced therefrom. The output member 21 is accurately positioned by means of a nose housing 25 received in the end portion of the main housing and secured thereto, as by axially extending cap screws 26, indicated in Fig. 2. The nose housing 25 has suitable slots 27 provided therein for receiving the cap screws 26 but permitting limited relative radial movement of the nose housing with relation to the main housing 2 upon a diameter of the nose housing 25. The position of the nose housing with relation to the main housing is controlled by an adjusting screw 28 in threaded engagement with the main housing 2 and extending radially thereof to contact the nose housing and by a set screw 29 in threaded engagement with the main housing 2 and in bearing contact with a portion of the periphery of the nose housing 25. The adjusting screw 28 has graduations on its exposed end face and a reference line (not shown) is provided on the adjacent part of the main housing 2 so that an accurate measurement of the positioning of the output member is provided. Preferably suitable flat areas are provided on the periphery of the nose housing for engaging with flat end portions of these adjusting and set screws 28 and 29.

The output member 21 is journalled in the nose housing 25 and is retained in position by means of conventional bearings 30 and 31 positioned between the periphery of the output member and the bore of the nose housing. The bearing 30 is held in place by engaging a shoulder 32 provided on a periphery of the output member 21, and by engaging a shoulder 33 provided in the bore of the nose housing 25. Shield rings 34 and 35 may be positioned adjacent the lateral margins of the bearing 30 to prevent the entry of foreign matter thereinto, which shield rings can be positioned in any desired manner. The bearing 31 is retained against axial movement in one direction by engaging a shoulder 36 provided in a portion of the bore of the nose housing 25 and by a retainer ring 37 secured to the axially inner end of the output member 21 by one or more set screws 38.

It will be realized that the output member or tool holder 21 provided in the separate attachment 1 of the invention can be of any desired construction and it is shown, for example, with an end mill 39 positioned therein.

In order to support the ring gear 3 and associated members on the tubular main housing 2, one additional relatively large diameter bearing 40 is provided in the attachment and is carried on the periphery of the main housing 2. A split snap ring 41 aids in locking this bearing 40 at a desired position, whereas the opposite lateral margin of the bearing 40 may engage a shield ring 42 positioned by a shoulder 43 on the periphery of the main housing 2. This shield ring 42 is positioned within the retainer for the ring gear 5.

To aid in controlling the position of the nose housing 25 on the main housing 2, a pair of aligned keys 44 are provided on a diametral line of the main housing. These keys 44 engage keyways 45 provided in the nose housing 25 to align it with the main housing 2 and prevent any relative rotation therebetween.

Figure 3:
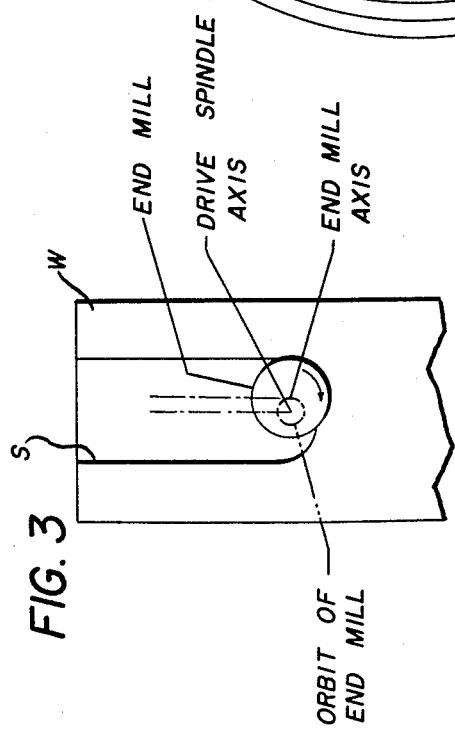
Fig. 3 is a diagrammatic view showing the action of an attachment of the invention.

A slot S is shown in a workpiece W, which slot is wider than the diameter of the end mill 39. The movement of the end mill 39 along the workpiece W and about the axis of the drive shaft 20 at the outer end thereof is clearly shown in Fig. 3.

From the foregoing, it will be seen that the sun gear spindle 10 can be driven at a predetermined rotational speed with relation to rotation of the main housing 2 and usually will be driven at a speed of from two to four times that of the main housing 2. It will be seen that with proper setting of the adjusting screw 28 and of the set screw 29, the nose housing 25 and associated means can be moved along the diameter of the main housing 2 in order to offset the output member 21 accurately a desired distance from the longitudinal axis of the drive attachment 1. By driving such output member at an increased speed with relation to the drive of the main housing 2, the entire periphery of any cutting tool positioned in the drive attachment can be brought into cutting engagement with the work piece.

It also will be realized that by offsetting the axis of the output member of the attachment with relation to the longitudinal axis of the attachment, the cutter tool in the output member will be moved through an orbit so as to produce a larger cut in diameter than the actual diameter of the cutter tool. Hence by proper adjustment of the offset relation of the output member with relation to the remainder of the attachment, an undersized tool can be used for cutting a standard dimension so that a tool which has been worn down to, for example, .480 inch diameter can be used for cutting a slot of .500 inch width by offsetting the axis of the output member .010 inch from the true longitudinal axis of the attachment 1.

It will be seen that the drive attachment of the invention is a relatively uncomplicated member and that it can be easily attached to standard machine tools for special cutting actions thereon. By retaining the axis of the output member parallel with the axis of the entire drive attachment, an end mill can be used for cutting a slot which has right angled corners at the base thereof, or, for example, holes parallel to the axis of the attachment can be drilled in a work piece. Standard size cuts can be produced with undersized tools, or off size cuts can be made with standard size tools, and in general it is contended that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. An end mill driving attachment for machine tools comprising a tubular main housing adapted for attachment to a driven shaft for rotation therewith, ring gear means encompassing a portion of said main housing, means for retaining said ring gear means stationarily positioned, a tubular sun gear spindle having an integral sun gear thereon, bearings journalling said sun gear spindle within said main housing, planet gears journalled on said main housing and connecting said ring gear means to said sun gear to drive said sun gear spindle upon rotation of said main housing, said sun gear spindle having a set of splines formed on the surface of its bore, a drive shaft having a set of crowned splines provided adjacent each end thereof, an output spindle having a bore with a set of splines at one section thereof, a nose housing received in an end of said main housing, means for varying the position of said nose housing with relation to said main housing on a diametral line extending normal to the longitudinal axis of said main housing, and bearing means journalling said output spindle in said nose housing, said output spindle being adapted to position an end mill therein, said drive shaft connecting said sun gear spindle to said output spindle and transmitting drive forces thereto by engagement of said sets of splines.

2. An end mill driving attachment for tools comprising a tubular main housing adapted for attachment to a driven shaft for rotation therewith, stationary ring gear means encompassing a portion of said main housing, a tubular sun gear spindle, a sun gear on said sun gear spindle and movable therewith, bearings journalling said sun gear spindle within said main housing, planet gears carried by said main housing and connecting said ring gear means to said sun gear to drive said sun gear spindle upon rotation of said main housing, said sun gear spindle having a set of splines formed on the surface of its bore, a drive shaft having two sets of spaced crowned splines provided thereon, an output spindle having a bore with a set of splines at one section thereof, a nose housing received in an end of said main housing, means for varying the position of said nose housing with relation to said main housing on a diametral line extending normal to the longitudinal axis of said main housing, means for securing said nose housing to said main housing, and bearing means journalling said output spindle in said nose housing, said output spindle being adapted to position an end mill therein, said drive shaft connecting said sun gear spindle to said output spindle and transmitting drive forces thereto through said splines.

3. In a machine tool, a tubular rotatable main housing, a drive spindle journalled within said main housing, power transmission means connecting said main housing to said drive spindle to drive it at a fixed speed increase with relation to said main housing, an output spindle, universal joint means telescopically engaged with said drive spindle connecting said drive spindle to said output spindle to transmit drive thereto, a nose housing received in an end of said main housing in substantial alignment therewith and rotating with and at the speed of said main housing, means for varying the position of said nose housing with relation to said main housing on a diametral line extending normal to the longitudinal axis of said main housing, and means journalling said output spindle in said nose housing, said output spindle being positionable on and offset from the axis of said main housing whereby a cutting tool carried by said output spindle can be given orbital movement at the rate of speed of said main housing and rotates on the axis of said output spindle at the fixed speed increase of said drive spindle determined by said power transmission means.

4. An end mill driving attachment for tools comprising a tubular main housing adapted for attachment to a driven shaft for rotation therewith, stationary ring gear means encompassing a portion of said housing, a sun gear spindle, a sun gear on said sun gear spindle, bearings journalling said sun gear spindle within said main housing in axial alignment therewith, planet gears journalled on said main housing and connecting said ring gear means to said sun gear to drive said sun gear spindle upon rotation of said main housing, an output spindle, universal joint means connecting said sun gear spindle to said output spindle for positive transmission of drive thereto, a nose housing received in said main housing in substantial alignment therewith, means for varying the position of said nose housing with relation to said main housing on a diametral line extending normal to the longitudinal axis of said main housing, and bearing means journalling said output spindle in said nose housing, said output spindle being positionable on the axis of said main housing.

5. An end mill driving attachment for tools comprising a tubular main housing adapted for attachment to a driven shaft for rotation therewith, a driven spindle, means connecting said main housing to said driven spindle to drive said driven spindle upon rotation of said main housing, an output spindle, universal joint means connecting said driven spindle to said output spindle for positive transmission of drive thereto, a nose housing telescopically received in said main housing in substantial alignment therewith, means securing said nose housing to said main housing for varying the position of said nose housing with relation to said main housing on a diametral line extending normal to the longitudinal axis of said main housing, and bearing means journalling said output spindle in said nose housing, said output spindle being positionable on the axis of said main housing.

6. A driving attachment for tools comprising a drive sleeve, a driven sleeve journalled within said drive sleeve, power transmission means for increasing the rotational speed of said driven sleeve and for connecting said drive sleeve to said driven sleeve, an output member, means telescopically engaged with said drive sleeve for variably positioning said output member in said drive sleeve in alignment with the axis of said driven sleeve and moving it to a position offset from the longitudinal axis thereof, and universal joint means within said drive sleeve connecting said driven sleeve to said output member to drive such member, said output member having orbital movement around the axis of said drive sleeve during rotation of said drive sleeve.

7. A machine tool for driving an end mill and comprising a driving member, a driven member within said driving member and concentric thereto, gear means operatively connected to and extending between the driving and driven members to transmit power therebetween, a tool holder telescopically received in said driving member, means journalling said tool holder in said driving member, means for adjusting said journalling means so as to position said tool holder in alignment with said driven member and parallel thereto but eccentrically thereof, and universal joint means connecting said driven member and said tool holder in driving relation, said tool holder being secured in said driving member for continuous uniform driven orbital movement around the axis of said driving member when said tool holder is eccentric to said driven member during rotation of said driving member.

References Cited in the file of this patent

UNITED STATES PATENTS

| | | |
|---|---|---|
| 725,266 | Merritt | Apr. 14, 1903 |
| 1,260,080 | Singer | Mar. 19, 1918 |
| 1,860,762 | Wyrick | May 31, 1932 |
| 2,312,354 | Norberg | May 16, 1942 |
| 2,451,497 | Kratchman | Oct. 19, 1948 |
| 2,718,820 | Faselt | Sept. 27, 1955 |

FOREIGN PATENTS

| | | |
|---|---|---|
| 275,881 | Switzerland | Sept. 1, 1951 |
| 514,784 | Germany | Dec. 17, 1930 |
| 523,982 | Belgium | Nov. 30, 1953 |
| 857,704 | France | Apr. 22, 1940 |